(12) United States Patent
Paxton et al.

(10) Patent No.: US 8,141,443 B2
(45) Date of Patent: Mar. 27, 2012

(54) PROBE SENSOR SHAFT BEARING ADAPTOR ASSEMBLY WITH CONDUIT ATTACHMENT

(75) Inventors: Kris Paxton, Bloomington, MN (US); Bradley D. Slye, Plymouth, MN (US)

(73) Assignee: Electro-Sensors, Inc., Minneapolis, MN (US)

( * ) Notice: Subject to any disclaimer, the term of this patent is extended or adjusted under 35 U.S.C. 154(b) by 503 days.

(21) Appl. No.: 12/399,072

(22) Filed: Mar. 6, 2009

(65) Prior Publication Data

US 2010/0224015 A1 Sep. 9, 2010

(51) Int. Cl.
*G01D 21/00* (2006.01)
(52) U.S. Cl. .................................................. 73/866.5
(58) Field of Classification Search ............... 73/866.5; 374/100; 384/462
See application file for complete search history.

(56) References Cited

U.S. PATENT DOCUMENTS

| | | | |
|---|---|---|---|
| 3,674,112 A * | 7/1972 | Roberts | 184/6.1 |
| 4,137,768 A * | 2/1979 | Tushie et al. | 374/208 |
| 4,495,810 A * | 1/1985 | Tessarzik et al. | 73/866.5 |
| 4,789,759 A | 12/1988 | Jones | |
| 5,410,104 A | 4/1995 | Gretz et al. | |
| 5,543,582 A | 8/1996 | Stark et al. | |
| 5,600,094 A | 2/1997 | McCabe | |
| 5,691,707 A * | 11/1997 | Smith et al. | 340/682 |
| 5,955,684 A | 9/1999 | Gravel et al. | |
| 6,045,261 A | 4/2000 | Rossum et al. | |
| 6,236,328 B1 * | 5/2001 | Smith et al. | 340/682 |
| 6,406,470 B1 | 6/2002 | Kierce | |
| 6,692,036 B2 | 2/2004 | Kingsford et al. | |
| 7,163,420 B2 * | 1/2007 | Montena | 439/578 |
| 2004/0250623 A1 * | 12/2004 | Walker et al. | 73/593 |
| 2007/0102050 A1 * | 5/2007 | Maldavs | 137/614.04 |

* cited by examiner

*Primary Examiner* — Hezron E Williams
*Assistant Examiner* — Tamiko Bellamy
(74) *Attorney, Agent, or Firm* — Leffert Jay & Polglaze, P.A.

(57) ABSTRACT

A probe adaptor assembly includes a probe opening into which a probe can be inserted. The probe is held in place by a compression fitting such that the probe depth, with respect to a longitudinal axis of the assembly, can be adjusted prior to the compression fitting being tightened to secure the probe. A conduit adaptor port is provided. A lubrication fitting provides an opening for a lubricant to be injected into the assembly. The lubrication fitting is coupled to the probe opening so that the lubricant injected into the fitting can exit the probe opening in order to lubricate the system into which the probe is inserted. In one embodiment, the probe adaptor assembly is configured to replace a lubrication fitting for a bearing so that a temperature of the bearing can be monitored while also providing lubrication.

18 Claims, 5 Drawing Sheets

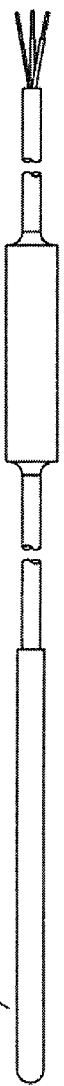
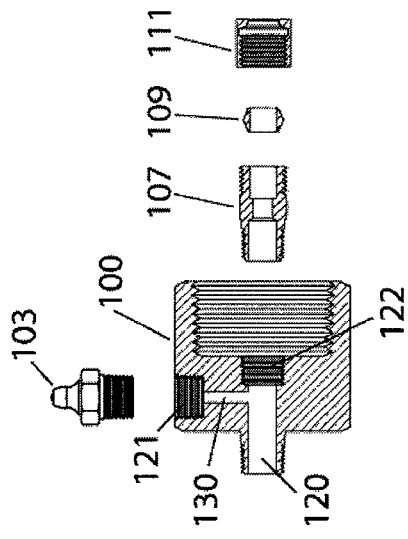
Fig. 1

PROBE SENSOR SHAFT BEARING ADAPTOR ASSEMBLY WITH CONDUIT ATTACHMENT

BACKGROUND

I. Field of the Invention

The present invention relates generally to cylindrical metal probe type sensors and more particularly to assemblies for holding sensors.

II. Description of the Related Art

Manufacturers and other industries use conveyor systems to move products along an assembly line. The conveyor systems can use rollers and bearings to move the belts. A conveyor system that moves heavy items or moves at high speeds can result in rollers and bearings that generate large amounts of heat. Thus, the bearings are typically monitored with temperature probes so that when the bearing reaches a certain temperature threshold, the system is shut down to prevent overheating of the bearing and/or other elements of the conveyor system.

The temperature probe mounting assemblies simply hold the temperature probe against the bearing in order to measure its temperature. These assemblies typically leave the probe exposed to the conditions in the factory that can be detrimental to the temperature probe as well as the cable connected to the probe.

Another problem with probe mounting assemblies is the lack of strain relief for the cable. For example, the weight and pull of the probe cable can, over time, cause alignment problems for the probe. There is a need in the art for an improved way to mount and enclose a probe.

SUMMARY

The present invention encompasses an apparatus to mount a probe in a bearing assembly in place of a lubrication fitting. The probe adaptor assembly includes a probe opening configured to accept a probe (e.g., temperature probe). A lubrication fitting opening is configured to accept a lubrication fitting wherein the lubrication fitting opening is coupled to the probe opening. Thus when a lubricant is injected into the lubrication fitting it can exit the probe opening. A compression fitting assembly is configured to accept the probe and hold the probe in the probe opening by a pressure fit around the probe. The compression fitting assembly provides the ability to adjust the probe depth prior to tightening of the compression fitting. A conduit attachment is configured to receive a conduit for substantially enclosing the probe and any probe cable.

BRIEF DESCRIPTION OF THE DRAWINGS

FIG. 1 shows an expanded view of one embodiment of a probe sensor shaft bearing adaptor with conduit attachment assembly.

DETAILED DESCRIPTION

Figure 2:
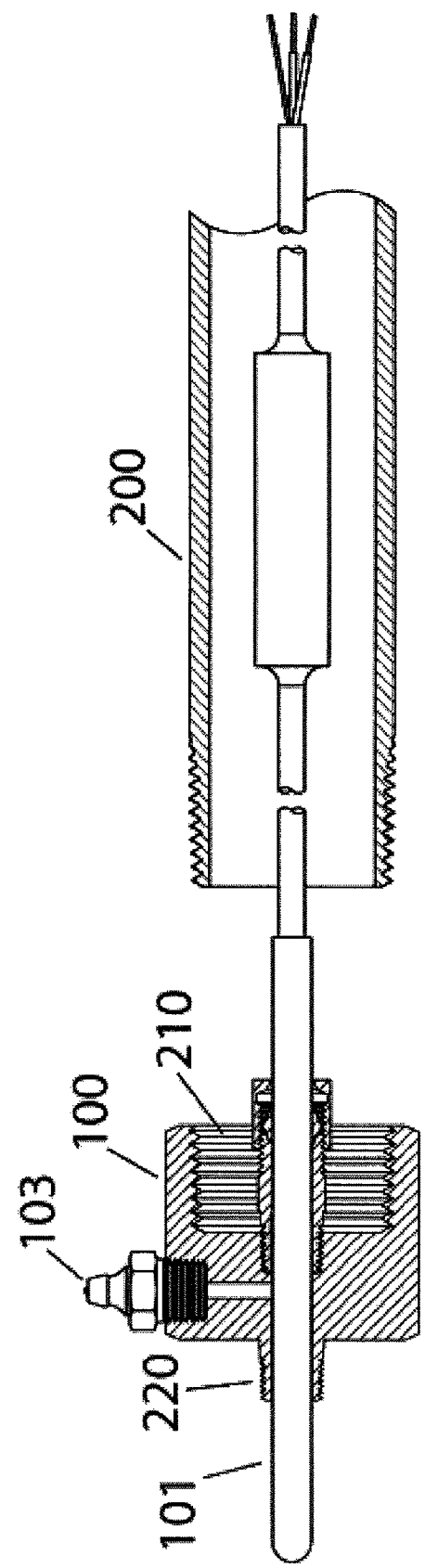
FIG. 2 shows an assembled view of the probe sensor shaft bearing adaptor with a rigid conduit attachment assembly.

The embodiments of the present invention provide a means for mounting a probe, such as a temperature probe, into a shaft bearing. The assembly provides for attachment of cable conduit, probe depth (into the bearing housing) adjustment, as well as means for injecting a lubricant.

FIG. 1 illustrates an expanded view of one embodiment of a complete probe/adaptor assembly. The adaptor assembly is comprised of the main housing 100 that incorporates an opening 120 into which the sensor probe 101 is inserted. The probe opening 120 is only slightly larger than the diameter of the probe so that, once the probe is inserted, there is no movement of the probe other than along the longitudinal axis of the opening 120. In fact, slight contact with the probe by the walls of the opening 120 is desirable.

A lubrication fitting 103 is screwed into a threaded opening 121 in the main housing 100. The lubrication fitting 103 is configured to accept a grease gun nozzle. In one embodiment, the lubrication fitting 103 is a ZERK fitting. The injected lubrication flows through a path 130 between the threaded lubrication fitting opening 121 and the probe opening 120 and it allowed to exit the assembly housing through the probe opening 120. As illustrated subsequently, this feature enables the lubrication to be applied to a bearing race through the probe opening 120 without removing the probe from the housing.

The main housing 100 is further comprised of a threaded opening 122 into which a compression fitting 107 can be inserted. The outside of the lower portion of the compression fitting 107 is also threaded so that the compression fitting 107 can be secured into the main housing 100 by screwing the fitting 107 into the fitting opening 122 of the probe opening 120.

The probe is secured in the adaptor assembly by a compression fitting assembly. The probe 101 is inserted into a compression nut 111 and compression ferrule 109 prior to being inserted into the compression fitting 107 in the main housing. The compression ferrule 109 encircles the probe. The compression nut 111 is threaded internally and mates with the external threads of the upper portion of the compression fitting 107. The mating of the compression nut 111 with the compression fitting 107 puts a compressing force on the ferrule 109 thus creating a tight seal around the probe 101, holding it in place and sealing around it to prevent grease leakage.

Using this type of compression assembly, the depth of the probe through the adaptor assembly is adjustable until the compression nut 111 is tightened. This allows the probe to be moved until it is contacting the bearing whose temperature is to be monitored. Thus, the adaptor assembly can be adjusted to fit more than one size and type of bearing assembly.

FIG. 2 illustrates a diagram of the assembled adaptor assembly of the present invention incorporating a rigid conduit assembly. This figure illustrates another feature of the adaptor assembly that enables a conduit 200 to be secured to the assembly. The rigid conduit 200 can be screwed into a threaded opening 210 at the end of the assembly to provide a protective conduit around the probe cable. The illustrated embodiment shows the conduit being threaded externally to mate with internal threaded surface of the main housing 100. An alternate embodiment can attach the rigid conduit 200 to the main housing 100 with other means such as an internally threaded surface to mate with an externally threaded surface of the main housing.

In one embodiment, the external portion of the end 220 of the assembly is also threaded to enable the entire assembly to be screwed into a grease fitting (e.g., ZERK) of a bearing, belt drive, or other assembly in which a temperature probe is desired. Thus, the probe adaptor assembly of the present invention replaces a standard grease fitting on the bearing while providing a temperature probe 101 and lubrication through the lubrication fitting 103 on the adaptor assembly.

Figure 3:
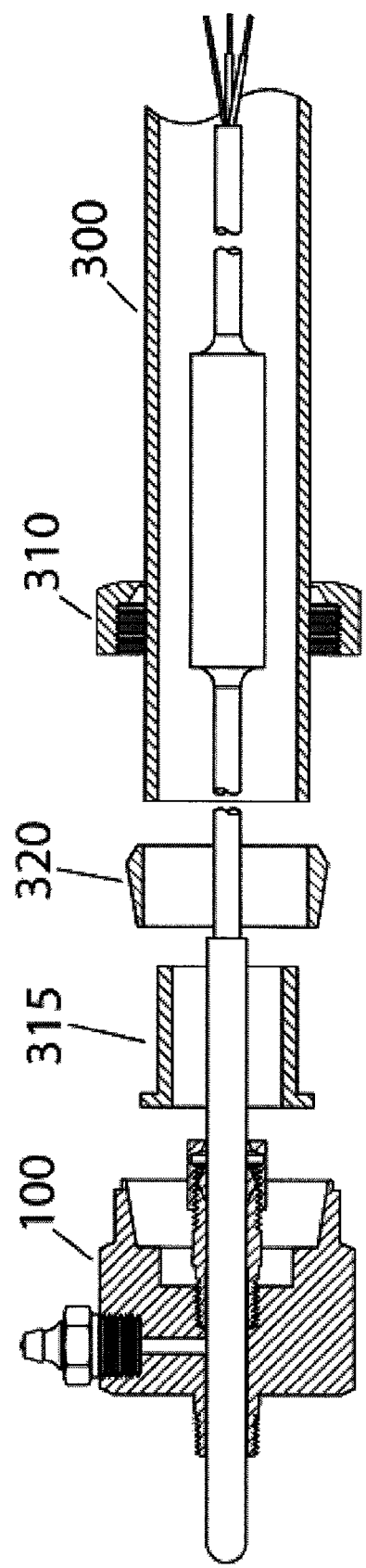
FIG. 3 shows an assembled view of the probe sensor shaft bearing adaptor with a flexible conduit attachment assembly.

FIG. 3 illustrates a diagram of the assembled adaptor assembly of the present invention incorporating a flexible conduit assembly. The flexible conduit 300 is connected to the main housing 100 with a pressure fit system. One embodiment of such a pressure fit system is comprised of an internal sleeve 315 that slides inside the conduit 300 and an external sleeve 320 into which the conduit 300 slides. A threaded connector 310 then mates with a threaded surface on the main housing 100 to create pressure on both sleeves 315, 320 to hold the conduit 300 in place.

Figure 4:
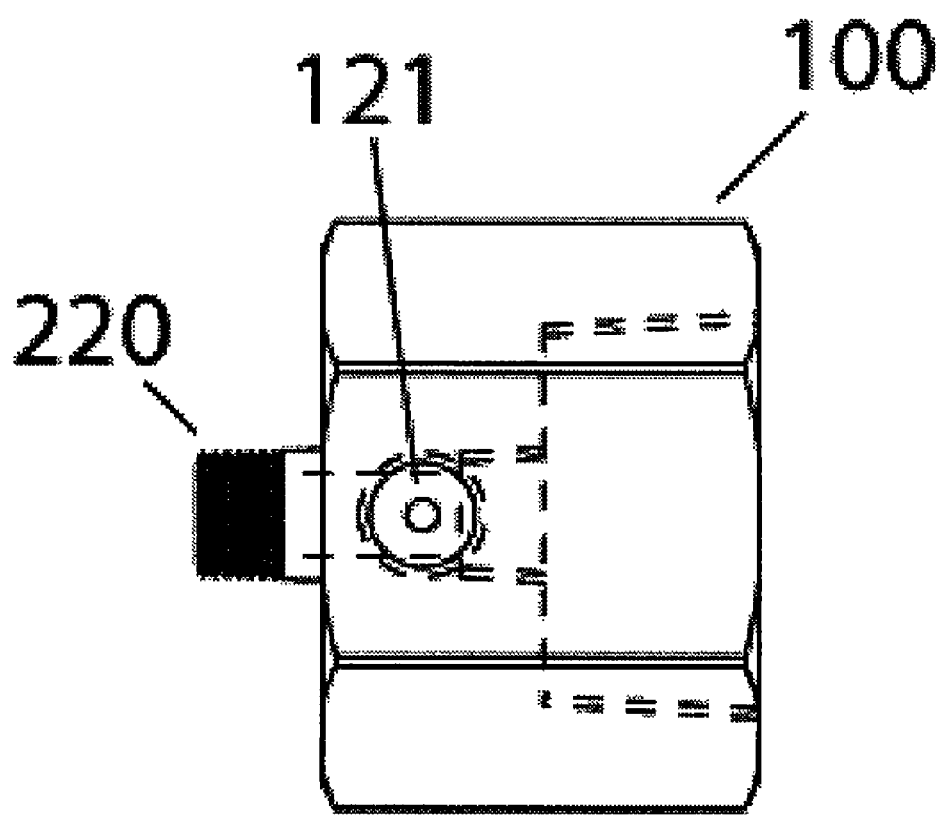
FIG. 4 shows an external view of one embodiment of the probe sensor shaft bearing adaptor with conduit attachment assembly.

FIG. 4 illustrates one embodiment of an external view of the probe adaptor assembly. The assembly is shaped in a hexagonal configuration 100 so that it can be inserted into a bearing assembly using a wrench. The external portion of the probe opening is threaded 220 so that it can mate with a threaded internal portion of a lubrication fitting in the bearing assembly. The lubrication opening 121 enables a lubrication fitting to be attached so that a lubricant can be injected into the assembly where it can exit through the probe opening in order to lubricate the bearing assembly.

Figure 5:
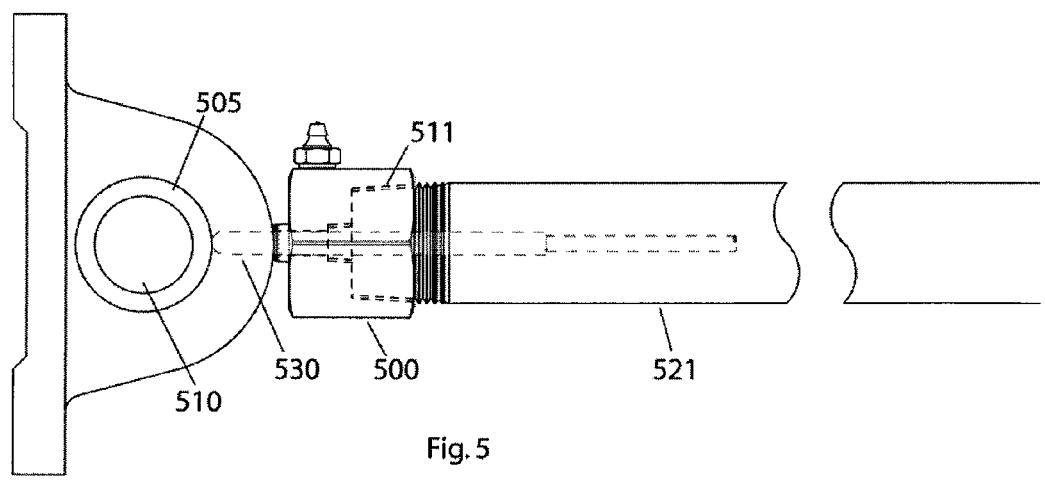
FIG. 5 shows a diagram of one embodiment of a rotating shaft system incorporating the probe sensor shaft bearing adaptor with conduit attachment assembly of the present invention.

FIG. 5 illustrates one embodiment of the probe adaptor assembly of the present invention as used in a system employing a rotating shaft. The rotating shaft can be part of a conveyor system or any other application in which a probe is necessary in a shaft bearing while still providing lubrication of the bearing.

The system of FIG. 5 uses a rotating shaft 510 that rotates within a bearing assembly 505. The probe adaptor assembly 500 of the present invention is inserted into a grease fitting opening in the bearing assembly 505. Since the probe adaptor assembly 500 replaces the grease fitting, the lubrication of the bearing can now be accomplished through the lubrication fitting on the probe adaptor assembly 500. A temperature probe 530 with a conduit 521 can then be inserted into the adaptor assembly 500 to provide temperature monitoring of the bearing while simultaneously providing lubrication of the bearing. With the compression fit assembly, the depth that the probe 530 can be inserted into the bearing is adjustable. In one embodiment, an external portion of one end of the probe opening is threaded in order to be attached to a threaded interior portion of the lubrication fitting opening.

The conduit 521 is connected to the end of the probe sensor shaft bearing adaptor assembly at a conduit connection 511. This can be a threaded connection as illustrated in previous figures. The conduit opening encircles the probe opening so that when a conduit 521 is attached, it substantially encloses the probe cable and any portions of the probe that extend from the assembly.

Numerous modifications and variations of the present invention are possible in light of the above teachings. It is therefore to be understood that within the scope of the appended claims, the invention may be practiced otherwise than as specifically described herein.

What is claimed is:

1. A probe adaptor assembly comprising:
   a main housing comprising:
      a probe opening that extends through a length of the housing and configured to accept a probe that extends through the probe opening;
      a lubrication fitting opening that is coupled to the probe opening and configured to accept a lubrication fitting wherein the lubrication fitting opening is configured to channel lubricant that is injected into the lubrication fitting out the probe opening around the probe;
      a compression fitting opening coupled to the probe opening; and
      a conduit opening coupled to the compression fitting opening and configured to accept a conduit that encircles the probe; and
   a compression fitting assembly configured to fit into the compression fitting opening and to accept and hold the probe in the probe opening by a compression fit around the probe.

2. The probe adaptor assembly of claim 1 wherein the probe is a temperature probe.

3. The probe adaptor assembly of claim 1 wherein the conduit opening comprises an internally threaded opening encircling an inner portion of the main housing.

4. The probe adaptor assembly of claim 3 wherein the conduit opening is further configured to accept a flexible conduit.

5. The probe adaptor assembly of claim 1 wherein the compression fitting assembly comprises:
   a compression fitting that is inserted into the probe opening;
   a compression nut that is configured to attach to the compression fitting; and
   a compression ferrule that encircles the probe within the compression nut when the compression nut is attached to the compression fitting.

6. The probe adaptor assembly of claim 5 wherein the compression fitting comprises a threaded outer surface to interface with a threaded inner surface of the compression fitting opening.

7. The probe adaptor assembly of claim 5 wherein the compression nut is threaded on an inner surface that mates with an outer threaded portion of the compression fitting.

8. A probe adaptor assembly comprising:
   a main housing comprising:
      a probe opening that extends through a length of the main housing and configured to accept a probe;
      a lubrication fitting opening having an inner threaded surface configured to accept a threaded lubrication fitting wherein the lubrication fitting opening and the probe opening create an open path such that lubricant injected into the lubrication fitting is enabled to exit the probe opening around the probe;
      a compression fitting opening coupled to the probe opening, the compression fitting opening having a threaded inner surface; and
      a conduit opening coupled to the compression fitting opening and having a threaded inner portion that encircles the probe wherein the threaded inner portion is configured to mate with a conduit to form an enclosure around the probe; and
   a compression fitting assembly comprising a compression fitting with a threaded outer surface to mate with the threaded inner surface portion of the compression fitting opening, a compression ferrule configured to encircle the probe, and a compression nut with a threaded inner surface that attaches to the threaded outer surface of the compression fitting to apply pressure to the compression ferrule.

9. The probe adaptor assembly of claim 8 wherein the lubrication fitting is a grease fitting.

10. The probe adaptor assembly of claim 9 wherein the grease fitting is configured to accept a grease gun.

11. The probe adaptor assembly of claim 8 wherein the probe opening is only large enough to accept the probe such that the probe can only move along a longitudinal axis of the assembly.

12. The probe adaptor assembly of claim 8 wherein the compression fitting assembly is configured to allow the probe to be adjusted along a longitudinal axis of the assembly prior to the compression nut being tightened on the compression fitting.

13. A shaft system comprising:
a shaft;
a bearing in which the shaft rotates;
a lubrication opening coupled to the bearing and configured to accept a lubricant; and
a probe shaft bearing adaptor assembly coupled to the lubrication fitting, the assembly comprising:
  a main housing comprising:
    a probe opening configured to accept a temperature probe through a length of the housing and into the lubrication opening;
    a lubrication fitting opening configured to accept a lubrication fitting wherein the lubrication fitting opening is coupled to the probe opening such that the lubricant injected into the lubrication fitting is channeled through the main housing to exit the probe opening from around the probe and into the bearing; and
  a compression fitting opening coupled to the probe opening;
  a compression fitting assembly configured to mate with the compression fitting opening and to accept the probe and hold the probe in the probe opening by a pressure fit around the probe; and
  a conduit attachment coupled to the main housing and configured to accept a conduit that substantially encloses the probe and a probe cable coupled to the probe.

14. The shaft system of claim 13 wherein the compression fitting is adjustable to enable adjustment of a depth that the probe is inserted into the bearing.

15. The shaft system of claim 13 wherein the shaft is configured to rotate within the bearing and is lubricated through the lubrication opening.

16. The shaft system of claim 13 and further including a threaded portion of the probe opening.

17. The shaft system of claim 16 wherein the threaded portion of the probe opening mates with a threaded portion of the lubrication opening.

18. The shaft system of claim 13 wherein the conduit is comprised of at least one threaded end to mate with a threaded surface of the conduit attachment.

* * * * *